United States Patent [19]

Gutierrez et al.

[11] 4,376,853

[45] Mar. 15, 1983

[54] PROCESSING OF GUAYULE MATERIAL BY VOLATILIZING AND HEATING STEPS

[75] Inventors: Richard Gutierrez, Canal Fulton; Edward L. Kay, Akron, both of Ohio

[73] Assignee: The Firestone Tire & Rubber Company, Akron, Ohio

[21] Appl. No.: 355,080

[22] Filed: Mar. 5, 1982

[51] Int. Cl.³ .................... C08G 83/00; C08L 93/00
[52] U.S. Cl. .................... 528/1; 260/412.8; 260/413; 260/814; 260/816 R; 260/816 G; 260/817; 260/818; 260/819; 260/821; 260/822
[58] Field of Search ............. 528/1, 951; 260/412.8, 260/413, 814, 816 R, 816 G, 817, 818, 819, 821, 822

[56] References Cited

U.S. PATENT DOCUMENTS

| | | | |
|---|---|---|---|
| 1,695,676 | 10/1928 | Yeandle | 260/816 |
| 1,753,184 | 4/1930 | Spence | 260/816 |
| 2,281,336 | 4/1942 | Stacom | 260/816 |
| 2,390,860 | 12/1945 | Williams | 260/818 |
| 2,459,369 | 1/1949 | Tint | 260/818 |
| 2,572,046 | 10/1951 | Meeks et al. | |
| 2,618,670 | 11/1952 | Clark | 260/818 |
| 2,665,317 | 1/1954 | Clark | 260/818 |
| 2,744,125 | 5/1956 | Meeks et al. | |
| 4,136,131 | 1/1979 | Buchanan | |
| 4,159,903 | 7/1979 | Bauman | |

OTHER PUBLICATIONS

JACS, vol. 66, (1944), pp. 2068–2074, Haagen–Smit et al.
Rubber World, Aug. 1981, pp. 26–29, Budiman et al.
Rubber World, Aug. 1981, pp. 30–33, Baird.

*Primary Examiner*—Howard E. Schain
*Attorney, Agent, or Firm*—Daniel N. Hall

[57] ABSTRACT

This invention relates to methods of processing guayule plant material. More particularly, it relates to processing methods, including volatilization and heating steps, by which resinous material, extracts and resins from guayule plants are converted and recovered.

13 Claims, No Drawings

PROCESSING OF GUAYULE MATERIAL BY VOLATILIZING AND HEATING STEPS

GENERAL BACKGROUND

The guayule plant, Parthenium argentatum Gray, which grows principally in the southwest United States and Mexico is known as a potential domestic source of rubber and organic chemicals. See, for example, the book "Guayule Reencuentro en el Desierto" published by Consejo Nacional de Ciencia y Tecnologia, Sal Tillo, Coahuila, Mexico (1978) and the magazine "Emergency Management," published by the Federal Emergency Management Agency, Washington, D.C., 20472, volume I, no. 4, 1981, pages 4–9. Rubber and other useful organic materials can be obtained from guayule by known processes involving comminuting (grinding) the material, extraction and/or water flotation. While much attention has been directed to the recovery and processing of elastomeric materials from guayule, less attention has been directed to utilization of the other organic materials which can be obtained from these sources such as resin. Since large amounts of rubber will probably be recovered from guayule in the future, it is clear that large amounts of other guayule organic products, such as oils and resin, will also become available. Therefore, methods for processing these other guayule products to convert them to useful materials such as liquids and gases which can be used as fuels, lubricants and chemical feedstock are of increasing interest. The present invention accomplishes these goals.

PRIOR ART

Guayule resin, that is those constitutents of the guayule plant obtained when the plant itself or resinous rubber prepared from it is extracted with an organic oxygenated solvent such as acetone, ethyl acetate and the like, has been described as a source of fatty acid and essential oils. (See, for example, U.S. Pat. Nos. 2,744,125 and 2,572,046 respectively.) Steam treatment of guayule plant material has been found to yield various terpene fractions as reported by Haagen-Smit, et al., J. Amer. Chem. Soc., 66 2068 (1944). The above identified book "Guayule" contains a paper by Belmares and Jimenez describing the development of varnishes and adhesives from guayule resin.

U.S. Pat. Nos. 4,136,131 and 4,159,903 to Buchanan and Balman, respectively, describe improved methods for processing guayule plants to provide rubber and enhancing rubber formation in the plant.

The use of thermal and catalytic techniques for processing various petroleum fractions to produce useful liquid and gaseous products are well known. See, for example, The Chemistry of Petroleum Hydrocarbons, edited by Brooks, et al., Reinhold Publishing Corp., NY (1955) particularly Volume II, chapters 22, 23, 24 and 28. No references have been found, however, to the processing of extracts, resins or feeds derived from guayule or similar sources.

SUMMARY OF THE INVENTION

It has now been found that useful liquid and gaseous products can be made from guayule plant material by processing it to provide a resinous extract and then, with or without optional intermediate steps, volatilizing at least a portion of the extract in some form to yield a vapor which is fragmented with heating. Such fragmentation occurs under the conditions specified below, often in the presence of petroleum cracking catalyst such as those comprising alumina, silica and at least one metal. The fragments can be recovered by cooling and/or absorption of the effluent to provide organic liquids and gases which are useful, for example as fuels, lubricants and chemical feedstocks. These organic liquids and gases are also within the scope of the invention.

DETAILED DESCRIPTION OF THE INVENTION

Among the plant materials that provide resinous materials that can be used in this invention are guayule and guayule-like plants which include a large number of species bearing rubber and related hydrocarbons such as guayule itself, Rabbit-Brush (*Crysothamnus nauseousus*), Rubbervine (*Cryptostegia grandiflora*), Milkweeds (*Asclepias incarnata, sublata, syriaca,* et al), Goldenrods (*Solidago altissima, graminifolia, leavenworthii, rigida,* et al), Sow thistles (*Sonchus arvensis oleraceous,* et al), Rosin Weeds (*Silphium species*), Mountain Mints (*Pycnanthemum species*), and *Cacalia atriplicifolia.* Many other plants which also produce organic extracts and resins are known, particularly among the compositae, Euphorbiaceae, Labiatae, and Moraceae. The resinous material from these can also be advantageously processed in this invention.

The above-described plant material can be processed by any number of known techniques to provide resinous material for use in this invention. Usually the plants are ground in various types of mill units such as hammermills, rollmills, stonemills, bowlmills, pulpmills and the like and then extracted or subjected to water flotation. Often this results in resinous material more or less free of rubber (generally containing less than 40% rubber and often less than 20% or 10% or even less than 5% rubber). Thus, this invention comprises the steps of:

(a)(i) processing guayule plants to provide resinous material;
(a)(ii) optionally, removing the solvent from the resinous material (i) to provide a resinous extract;
(a)(iii) optionally, recovering rubber from the resinous material or extract to leave a resin (containing less than 5% rubber);
(a)(iv) optionally, adding an organic carrier to the resinous material, extract or resin to provide feed;
(b) volatilizing at least a protion of the resinous material, extract, resin, feed or a mixture thereof to provide vapor;
(c) heating the vapor (b) in a heating chamber at a temperature and pressure and for a time sufficient to cause a portion of it to fragment;
(d) removing the fragments from the chamber as effluent; and
(e) recovering the fragments from the effluent.

In the preceding description of the invention, resinous material refers to material from processing of guayule plants by whatever techniques are appropriate. Resinous material may, but not necessarily does, contain, in addition to resin, rubber, solvent, and other naturally occurring contaminants. Resinous extracts contain all the components of resinous material except solvent (less than 2%) while resin is substantially solvent-and-rubber-free (less than 2% of each). The organic solvent referred to can be either an oxygenated solvent such as an alcohol, ketone, ester or ether of one to about eight carbon atoms (or a mixture of two or more thereof) or a hydrocarbon solvent having a boiling range between about 50°–150° such as hexane, heptane, octane, nonane or mixtures thereof. Aromatic solvents such as benzene, toluene and the like can be used either alone or in a mixture with each other. Techniques for solvent extraction of comminuted quayule plant material are known and have been described previously, for example, in U.S. Pat. Nos. 149,862, now abandoned, 298,447 and 307,405. The relevant portions of these applications are incorporated by reference herein for their disclosures relating to processing of guayule plant material to provide resin and resinous material.

As noted, the resinous material is often obtained in the form of a solution. This solution can be volatilized directly to provide a vapor as described below. Optionally and more typically, it is first processed to remove solvent from the mixture to provide a resinous extract. This solvent removal can be accomplished by any convenient technique such as distillation steam distillation, adsorption, absorption, extraction (with a second solvent for the first solvent, but not the extract) and the like. No matter what technique or combination of techniques is used, a resinous extract results which optionally can be further processed to recover any rubber present and leave a resin (generally containing less than 2% rubber). Techniques for recovering rubber from resinous material and extracts are known and include extraction with a rubber solvent, water flotation and combinations thereof. Detailed descriptions of such techniques appear; for example, in U.S. patent application, Ser. No. 149,862, now abandoned, which is hereby incorporated by reference for its disclosures relating to recovery of guayule rubber. Such removal of rubber leaves as a residue a resin which can, optionally, be diluted by adding an organic carrier. Such carriers are added to either the resinous material, extract or resin and serve to reduce the viscosity thereof and thereby facilitate their handling and further processing. Usually, the carrier is an aromatic hydrocarbon having a boiling point above 80°. Typical organic carriers include xylene, various substituted naphthlene, particularly one and two methyl naphthlene. Addition of the carrier to the resinous material, extract and/or resin provides a relatively fluid feed for the next step in the process which is easily handled, pumped and transferred between processing units.

The steps and substeps described hereinabove can be combined in various ways and the various optional steps employed or not as dictated by the particular circumstances as will be apparent to those skilled in the art. Often this will depend on the techniques used to process the guayule plants to provide the resinous material. Sometimes this resinous material will be free of rubber (that is, it will contain less than 2% rubber). In such instances, optional step (a)(iii) will not be used. In other cases, the resinous material will be in a solvent and optional step (a)(ii) will be included. For example, the organic solvent can be the aforedescribed alcohol, ketone, ester or ether of one to about eight carbon atoms or a mixture of two or more thereof and step (a)(iii), the recovery of the rubber from the resinous extract, omitted. Often in such an instance, the organic solvent is an alcohol such as methanol, propanol or isopropanol or a ketone such as acetone, methol ethyl ketone or methyl isobutyl ketone or mixtures thereof. In other circumstances, a hydrocarbon solvent such as a C5-8 hydrocarbon can be employed and optional step (a)(iii) is carried out. In still other instances, either or both of the optional steps of removing the solvent (a)(ii) and adding the carrier (a)(iv) are effective. In still other instances, a carrier such as an aromatic hydrocarbon having a boiling point above about 80° is employed.

The next step in the inventive process, step (b), comprises volatilization of at least a portion of the resinous material, extract, resin, feed or mixture thereof to provide a vapor. Those skilled in the art are aware of suitable means for accomplishing this volatilization. Details need not be recited here since the present invention is not limited to any particular means of volatilization. In a typical embodiment, step (b) is accomplished in a preheater where at least about 30% of the material to be volatilized is volatilized. Temperatures of approximately 200° to 900° are used. Pressures varying from vacuum (approximately 50 mm of Hg) to atmospheric prevail.

The vapor provided by volatilization step (b) is then heated in a heating chamber at a temperature and pressure and for a time sufficient to cause a portion of it to fragment, that is, to form lower molecular weight molecules. This fragmentation manifests itself by a reduction in the boiling range of the vapor. Again, any suitable means for achieving the desired conditions in the heating chamber can be used. Typically, an oven is provided. This oven can be conveniently fueled by a portion of the effluent from the process. The temperature in the heating chamber, when combined with the prevailing pressure and resinance time of the vapor in it, is sufficient to cause a portion of the volatilized material to fragment. Usually, this temperature will range from about 200°–800°. Residence time will typically vary between about 0.001–2 hours, and the pressure from ambient (atmospheric) to as low as about 50 mm of mercury. Temperatures ranging from 200°–750° are often found useful particularly in the presence of a catalyst such as the petroleum cracking catalyst described below. Residence times of about 0.001–0.5 hours can be used.

As indicated, at least one catalyst, typically a petroleum cracking catalyst, is present during the heating step (c). Many such catalysts are known to those skilled in the art and can be used in the invention which is not limited to a particular type of catalyst. Typical catalysts comprise alumina, silica and at least one metal. The use of catalyst is often found to permit lower heating temperatures and shorter residence times and to provide increases and/or variations in the yield and distribution of products produced by the inventive method. A specific catalyst which can be used in this invention is an alumina catalyst, sold by the AKZO Chemie Nederland Company of the Netherlands, designated as fluid cracking catalyst KETJEN CAT series MZ-7X. This catalyst is more fully described below. Since the invention is not limited to a particular catalyst, or even the presence of a catalyst at all, variations in this regard can and will be made by those skilled in the art.

After residence in the heating chamber for the desired temperature, pressure and time sufficient to fragment at least a portion of the vapor, the fragments are removed from the chamber (step d) and recovered (step e). Means for accomplishing these steps are known to those skilled in the art and need not be recited in detail. Typically, recovery is accomplished by cooling and/or absorption in solid or liquid absorbants. Typically, the fragments are removed as an effluent which is cooled to about 0°, more typically about 0°–30° to condense the liquid fraction. Any gaseous fraction is then trapped, for example, in a gas bottle over water or by any other convenient means. Often, cooling of the fragmented vapor to about 0° will provide about 25-75% organic liquid (based on the weight of the vapor). This liquid will contain fractions varying from light gasoline through heavy gas oil as defined by appropriate ASTM standards. By adjusting such heating chamber parameters such as temperature, residence times, pressure and catalyst, variations in product distribution can be obtained such as, for example, to provide lubricating oil fractions and feedstocks for chemical processing. Among the latter may be gaseous fractions containing unsaturates such as ethylene, propylene, isomeric butylene mixtures, pentane, butadiene and similar products. The liquid produced by cooling and/or absorbing the effluent of the invented method to about 0°-30° can also be further processed by physical and/or chemical means to provide liquid fuel, and liquid lubricants, semi-solid greases, liquid, gaseous or solid chemical feedstocks. These materials can be used for such purposes either alone or in combination with other materials obtained for more conventional sources.

A better understanding of the invention can be obtained by reference to the following example in which all percentages and parts are by weight and all temperatures are in degrees centigrade as is true of the temperatures in the remainder of this specification and the appended claims.

EXAMPLE

A micro activity catalyst test apparatus is used to conveniently illustrate the invention. The procedure and apparatus are essentially those described in ASTM D-3907-80 (part 25, page 978, entitled "Fluid Cracking Catalyst by Micro Activity Tests"). During this example, vapor from guayule resin is passed over cracking catalyst contained in a fixed bed reactor. The fragmented liquid products in the effluent are recovered and analyzed as are the gaseous and solid products. The conversion expressed in percent is the difference between the weight of the feed and unconverted product. After passage of the feed over the catalyst, the reactor is purged with nitrogen and any organic material stripped in this nitrogen purge is added to the product receiver. The catalyst is then removed from the reactor heating chamber and the amount of carbonized material on it determined. Non-condensable products in the effluent are recovered by displacement of a suitable liquid in a gas bottle.

The condensed fractions (collected at essentially 0°) are weighed and analyzed by gas chromatography. The non-condensable gases are also analyzed by chromatography. The condensed products are analyzed by ASTM D2887 entitled "Tests for Boiling Range Distribution of Petroleum Fractions by Gas Chromatography." The results in the following examples are expressed as percent conversion to light gasoline (corresponds to approximately 95% of the sample distilling at 100° or lower), heavy gasoline (fraction distilling from 100° to 216°) and light cycle oil (fraction distilling from 216° to 347°). The catalyst used in these examples is available from AKZO CHEMO NEDERLAND under the name Fluid Cracking Catalyst KETJEN CAT, series MZ-7X. This catalyst is a low surface area cracking catalyst with excellent attrition properties. Its chemical composition (percent dry base) is:

| | |
|---|---|
| Alumina ($Al_2O_3$) | 30 |
| Sodium Oxide ($Na_2O$) | 0.3 |
| Iron (Fe) | 0.3 |
| Sulphate ($SO_4$) | 0.1 |

Physical properties are: g/ml, 0.80; Surface area, $m^2/g$, 150; Pore Volume, ml/g, 0.28. Guayule resin was obtained by acetone deresination of freshly harvested, ground guayule using essentially the procedure described in U.S. Ser. No. 149,862 which is hereby incorporated by reference for its disclosures on the isolation and recovery of guayule resin. The resin was diluted with 1-methyl naphthalene (50%) to decrease its viscosity. A correction is made in the results for the presence of the 1-methyl naphthalene diluent. The methyl naphthalene/guayule resin feed is processed using the above-noted ASTM procedure. The conversion of resin to products is calculated to be 46.6%. Material balance accounts for 99.3% of the charge. The product distribution of fragments is summarized in Table I. Since the material balance in the experiment is high (99.3%), the weight percent values are adjusted to 100%. This makes the general distribution of the fragmented-resin products as non-condensable gas, liquid and solid more readily apparent. It should be noted that the hydrogen gas value is included in the total non-condensable gas value and that the "coke on catalyst" value is also included in the "Total Coke" value.

TABLE I

Microactivity Testing of Guayule Resin: Product Distribution

| | Weight % |
|---|---|
| Conversion | 46.6 |
| Material Balance | 99.3 |
| Total Non-Condensable Gas | 11.7 |
| Hydrogen Gas | 0.02 |
| Light Gasoline | 9.6 |
| Heavy Gasoline | 15.9 |
| Light Cycle Oil | 51.5 |
| Residue* | 1.7 |
| Total Coke | 9.6 |
| Coke on Catalyst | 3.2 |

*Residue value of gas chromatographic procedure.

It will be noted from the data in Table I that 11.7% of the fragmented guayule resin appears as a non-condensable gas of which 0.02% is identified as hydrogen. This indicates that it should be possible to obtain a gaseous fuel by a thermal processing of guayule resin. Highly branched organic compounds are present in the resin and would be expected to produce useful fuel products during thermal processing. The bulk of the fragmented guayule resin appears as a liquid fraction such as light gasoline (9.6%), heavy gasoline (15.9%) and light cycle oil (51.5%). This illustrates the production of useful products from thermal processing of guayule resin.

The non-volatile residue as well as the coke values observed are probably caused by the presence of 4.5% of water soluble fraction in the guayule resin used to produce the feed. If desired, the crude resin can first be processed with water to remove this fraction and minimize the amount of coke formation. This may not be desirable in all cases since the small amount of coke on the catalyst might be beneficial to the overall process in some respects. The catalyst can be regenerated, for example, by air purges which burn the coke to volatile carbon oxides, a well known, highly exothermic reaction resulting in heating of the catalyst bed. Such a procedure would lower process costs and, at the same time, utilize the coke.

It will be understood that the example given above is for illustrative purposes only and in no way limits the scope of the invention. Modifications in the equipment and the procedures employed as well as the feed and conditions will be apparent to those skilled in the art and within the scope of the invention.

What is claimed is:

1. A method of processing guayule resinous material comprising the steps of:
   (a)(i) processing guayule and/or related plants to provide resinous material;
   (a)(ii) optionally, removing solvent from the resinous material to provide a resinous extract;
   (a)(iii) optionally, recovering rubber from the resinous material or extract to leave a resin;
   (a)(iv) optionally, adding an organic carrier to the resinous material, extract or resin to provide feed;
   (b) volatilizing at least a protion of the resinous material, extract, resin, feed or a mixture thereof to provide vapor;
   (c) heating the vapor (b) in a heating chamber at a temperature and pressure and for a time sufficient to cause a portion of it to fragment;
   (d) removing the fragments from the chamber as effluent; and
   (e) recovering the fragments from the effluent.

2. The method of claim 1 wherein the organic solvent is an alcohol, ketone, ester or ether of one to about eight carbon atoms or mixture of two or more thereof, step (a)(iii) is omitted and the fragments are recovered by cooling and/or absorption.

3. The method of claim 1 wherein the organic solvent is a $C_{5-8}$ hydrocarbon and step (a)(iii) is carried out.

4. The method of claim 2 wherein either or both of the optional steps of removing the solvent and adding carrier are carried out.

5. The method of claim 4 wherein the solvent is acetone and the carrier is an aromatic hydrocarbon having a boiling point above about 80°.

6. The method of claim 5 wherein the resin is extracted with water before being carried on to step (b).

7. The method of any one of claim 1-6 wherein in step (c) the pressure is ambient, the temperature between about 200°-800° and the residence time between about 0.001-2 hours.

8. The method of any one of claim 1-6 wherein at least one petroleum cracking catalyst is present during step (c) and (c) is carried out at a pressure of about 50 mm of $H_g$ up to ambient and between about 200°-750° for about 0.001-05 hours.

9. The method of claim 5 wherein a petroleum fluid cracking catalyst comprising alumina, silica and at least one other metal is present during step (c) and (c) is carried out at a pressure of about 50 mm of Hg up to ambient and between about 200°-250° for about 0.001-0.5 hours.

10. The method of any one of claims 1-6 wherein the fragmented vapor is cooled to about 0° to provide about 25-75% of organic liquid (based on the weight of the vapor).

11. The method of claim 1 wherein optional step (a)(iii) is carried out and the resin left contains less than 2% rubber.

12. An organic liquid produced by cooling and/or absorbing effluent of the method of any one of claim 1-6 to about 0°-30°.

13. A liquid fuel, lubricant or chemical feedstock comprising the liquid produced by cooling and/or absorbing the effluent of the method of claim 9 to about 0°-30°.

* * * * *